US012694539B2

(12) United States Patent
Abbeloos et al.

(10) Patent No.: US 12,694,539 B2
(45) Date of Patent: ***Jul. 28, 2026

(54) METHOD FOR TRACKING POSITION OF OBJECT AND SYSTEM FOR TRACKING POSITION OF OBJECT

(71) Applicants: TOYOTA JIDOSHA KABUSHIKI KAISHA, Toyota (JP); KATHOLIEKE UNIVERSITEIT LEUVEN, Leuven (BE)

(72) Inventors: Wim Abbeloos, Brussels (BE); Gabriel Othmezouri, Brussels (BE); Frank Verbiest, Zichem (BE); Bruno Dawagne, Leuven (BE); Wim Lemkens, Leuven (BE); Marc Proesmans, Lede (BE); Luc Van Gool, Merksem (BE)

(73) Assignees: TOYOTA JIDOSHA KABUSHIKI KAISHA, Toyota (JP); KATHOLIEKE UNIVERSITEIT LEUVEN, Leuven (BE)

( * ) Notice: Subject to any disclaimer, the term of this patent is extended or adjusted under 35 U.S.C. 154(b) by 289 days.

This patent is subject to a terminal disclaimer.

(21) Appl. No.: 18/473,455

(22) Filed: Sep. 25, 2023

(65) Prior Publication Data

US 2024/0144487 A1 May 2, 2024

(30) Foreign Application Priority Data

Oct. 26, 2022 (EP) ..................................... 22203823

(51) Int. Cl.
*G06T 7/246* (2017.01)
*G06T 5/20* (2006.01)
(Continued)

(52) U.S. Cl.
CPC ................ *G06T 7/246* (2017.01); *G06T 5/20* (2013.01); *G06T 7/73* (2017.01); *G06V 10/25* (2022.01);
(Continued)

(58) Field of Classification Search
CPC ......... G06T 7/246; G06T 7/579; G06T 7/277; G06T 5/20; G06T 2207/30252; G06V 2201/07
See application file for complete search history.

(56) References Cited

U.S. PATENT DOCUMENTS 9,135,715 B1 * 9/2015 Klingner ................. G06T 7/593
9,196,054 B2 11/2015 Yous et al.
(Continued)

FOREIGN PATENT DOCUMENTS

CN 106326810 A 1/2017
EP 3109796 A1 12/2016
(Continued)

OTHER PUBLICATIONS

Ventura, J., Arth, C., & Lepetit, V. (2015), "An Efficient Minimal Solution for Multi-Camera Motion," 2015 IEEE International Conference on Computer Vision (ICCV), 747-755, 10.1109/ICCV.2015. 92.
(Continued)

*Primary Examiner* — Sumati Lefkowitz
*Assistant Examiner* — Wayne Zhang
(74) *Attorney, Agent, or Firm* — Dickinson Wright, PLLC

(57) ABSTRACT

A method for tracking a position of an object in a scene surrounding a mobile machine based upon information acquired from monocular images, includes: acquiring at least a first image at a first time and a second image at a second time, the first image and the second image each including image data corresponding to the object and a scene
(Continued)

feature present in the scene surrounding the mobile machine; detecting the object in the first image and the second image; matching the scene feature across the first image and the second image; performing an estimation of an egomotion of the mobile machine based upon the scene feature matched across the first image and the second image; and predicting a position of the object taking into account the estimation of the egomotion of the mobile machine.

6 Claims, 2 Drawing Sheets

(51) Int. Cl.

| | | |
|---|---|---|
| *G06T 7/73* | (2017.01) | |
| *G06V 10/25* | (2022.01) | |
| *G06V 10/44* | (2022.01) | |
| *G06V 10/74* | (2022.01) | |

(52) U.S. Cl.
CPC ............ *G06V 10/44* (2022.01); *G06V 10/761* (2022.01); *G06V 2201/07* (2022.01)

(56) References Cited

U.S. PATENT DOCUMENTS

| | | | | |
|---|---|---|---|---|
| 10,318,826 | B2 * | 6/2019 | Zhang | .................... G06V 20/58 |
| 2015/0086078 | A1 * | 3/2015 | Sibiryakov | ........... G06T 3/4038 |
| | | | | 382/104 |

| | | | | |
|---|---|---|---|---|
| 2017/0277197 | A1 | 9/2017 | Liao et al. | |
| 2018/0284777 | A1 * | 10/2018 | Li | ........................ G06V 10/462 |
| 2021/0082086 | A1 | 3/2021 | Bichu et al. | |
| 2021/0181719 | A1 * | 6/2021 | Vasko | ................ G05B 19/4183 |
| 2022/0027642 | A1 * | 1/2022 | Shambik | ................... G06T 7/73 |
| 2023/0143370 | A1 | 5/2023 | Qian et al. | |
| 2023/0386055 | A1 * | 11/2023 | Lee | ......................... G06T 7/529 |
| 2024/0070916 | A1 | 2/2024 | Lee | |
| 2024/0127470 | A1 * | 4/2024 | Park | ................. B60W 50/0097 |

FOREIGN PATENT DOCUMENTS

| | | |
|---|---|---|
| WO | 2020/164744 A1 | 8/2020 |
| WO | 2021/004642 A1 | 1/2021 |
| WO | 2021037350 A1 | 3/2021 |
| WO | 2022/028673 A1 | 2/2022 |

OTHER PUBLICATIONS

Wim Abbeloos et al., U.S. Appl. No. 18/234,939, Non-Final Office Action issued Nov. 3, 2025.
Davide Scaramuzza et al: "Visual Odometry [Tutorial]", IEEE Robotics & Automation Magazine, IEEE Service Center, Piscataway, NJ, US, vol. 18, No. 4, Dec. 1, 2011 (Dec. 1, 2011), pp. 80-92.
Friedrich Fraundorfer et al: "Visual Odometry : Part II: Matching, Robustness, Optimization, and Applications", IEEE Robotics & Automation Magazine, IEEE Service Center, Piscataway, NJ, US, vol. 19, No. 2, Jun. 1, 2012 (Jun. 1, 2012), pp. 78-90.

* cited by examiner

METHOD FOR TRACKING POSITION OF OBJECT AND SYSTEM FOR TRACKING POSITION OF OBJECT

CROSS-REFERENCE TO RELATED APPLICATION

This application claims priority to European Patent Application No. 22203823 filed on Oct. 26, 2022, incorporated herein by reference in its entirety.

BACKGROUND

1. Technical Field

The present disclosure relates to a method for tracking a position of an object and a system for tracking a position of an object.

2. Description of Related Art

In both autonomous and non-autonomous vehicles, detecting both moving and stationary objects present in areas surrounding a vehicle, by a human driver of a vehicle and/or an autonomous driving system of a vehicle, is imperative for providing and maintaining vehicle safety. In this context, an object in an area surrounding a vehicle may be other vehicles, pedestrians, cyclists, road margins, traffic separators, buildings, trees, and/or the like. Additionally, an object in an area surrounding a vehicle must be detected in an immediate vicinity of the vehicle, as well as in longer distances ahead of the vehicle, in order to maintain awareness in an area in close proximity of the vehicle and to anticipate an area distant to the vehicle.

Currently available systems for detecting objects in an area surrounding a vehicle may include the use of deep learning networks to extract 3D (three-dimensional) information corresponding to an object via individual images, overlapping images, video, and/or the like obtained from one or more monocular camera. These systems largely depend upon the availability of ground truth information to train the systems for detection of objects in an area surrounding a vehicle. The ground truth information is typically obtained through use of sensors such as LiDAR, stereo cameras, and/or the like, which are configured to provide depth information corresponding to objects in an area surrounding a vehicle.

SUMMARY

Reliance on ground truth information to train the systems for detection of objects in an area surrounding a vehicle may include disadvantages, as a range of detection of an object in an area surrounding a vehicle by sensors is limited. In such a scenario, a depth of an object in an area surrounding a vehicle may be determined by uplifting 2D information corresponding to the object into 3D space utilizing known intrinsic parameters of a camera in the corresponding system. Further, movement of a vehicle and/or the corresponding system within an area surrounding the vehicle may cause a substantial amount of jitter to be observed in an image plane when tracking an object within the area surrounding the vehicle. As such, jitter may also be observed in an image plane when tracking an object within an area surrounding a vehicle due to movement of the vehicle and/or the corresponding system over uneven terrain, such as when traveling over bumps, cobblestone roads, and the like. Consequently, currently available systems may be unreliable.

It is desirable to provide an improved method and system for detecting, predicting, and/or tracking a position of an object within an area surrounding a vehicle, which extends beyond a range of ground truth information acquired to train aspects of the method and system, to stabilize detection, prediction, and/or tracking a position of an object within an area surrounding a vehicle.

According to a first aspect of the present disclosure, a method for tracking a position of an object in a scene surrounding a mobile machine based upon information acquired from monocular images is provided. The method includes acquiring at least a first image at a first time and a second image at a second time, the first image and the second image each including image data corresponding to the object and a scene feature present in the scene surrounding the mobile machine; detecting the object in the first image and the second image; matching the scene feature across the first image and the second image; perform an estimation of an egomotion of the mobile machine based upon the scene feature matched across the first image and the second image; and predicting a position of the object taking into account the estimation of the egomotion of the mobile machine.

According to a second aspect of the present disclosure, a system for tracking a position of an object in a scene surrounding a mobile machine is provided. The system includes one or more imaging device configured to acquire at least a first image at a first time and a second image at a second time, and an electronic control system configured to process the first image and the second image. The first image and the second image each include image data corresponding to the object and a scene feature present in the scene surrounding the mobile machine. The electronic control system includes one or more processors configured to detect the object in the first image and the second image, match the scene feature across the first image and the second image, perform an estimation of an egomotion of the mobile machine, and predict a position of the object taking into account the estimation of the egomotion of the mobile machine.

In the manner described and according to aspects illustrated herein, the method and the system are capable of tracking an object in a scene surrounding a vehicle, while stabilizing detection, tracking, and/or prediction of the position of the object within an image plane of the scene surrounding the vehicle, beyond a range of ground truth information acquired to train aspects of the method and system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
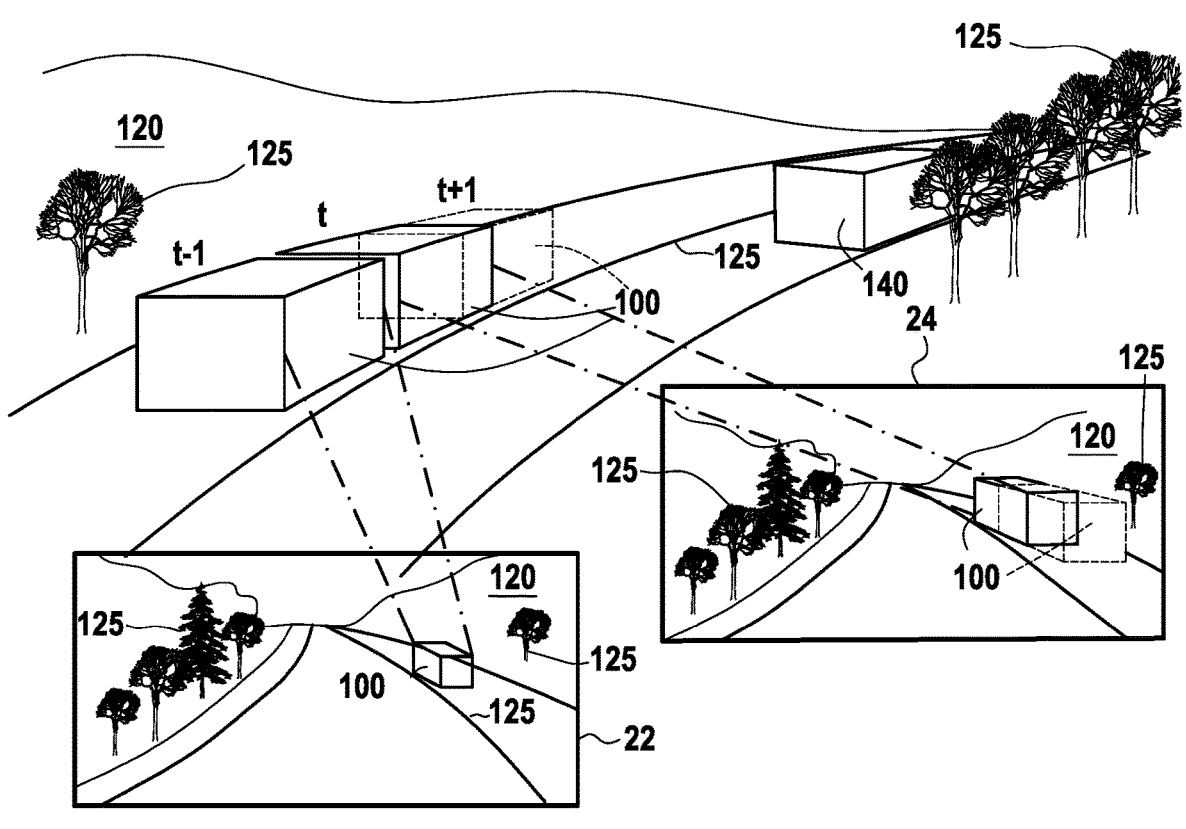
FIG. 1 is a view of implementation of a method for tracking an object in a scene surrounding a vehicle according to aspects of the disclosure.

An embodiment of a method and system for tracking a position of an object in a scene surrounding a vehicle according to aspects of the disclosure will now be described with reference to FIGS. 1-4, wherein like numerals represent like and/or functionally similar parts. Although the method and system are described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Additionally, the language used herein has been principally selected for readability and instructional purposes, and may not have been selected to delineate or circumscribe inventive subject-matter. Accordingly, the disclosure of the present disclosure is intended to be illustrative, but not limiting, of the scope of the disclosure, which is set forth in the claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present inventive subject matter.

Some aspects described herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "estimating (performing an estimation)," "determining," or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, and/or hardware, and when embodied in software, could be downloaded to reside on and be operated from different platforms used by a variety of operating systems.

The present disclosure also relates to a control device (referred to herein as an "electronic control system") for performing the operations of the method and system discussed herein. The control device may be specially constructed for the required purposes, or the control device may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memory (ROM), random access memory (RAM), erasable programmable read-only memory (EPROM), electrically erasable programmable read-only memory (EEPROM), magnetic or optical cards, reduced instruction set computer (RISC), application specific integrated circuit (ASIC), or any type of media suitable for storing electronic instructions, and each coupled to a computer system bus. Furthermore, the computers referred to herein may include a single processor or architectures employing multiple processor designs for increased computing capability.

The algorithms and displays presented herein are not inherently related to any particular computer or other apparatus. Various general-purpose systems may also be used with programs in accordance with aspects presented herein, or it may prove convenient to construct a more specialized apparatus to perform the required method steps. The required structure for a variety of these systems will appear from the aspects disclosed herein. In addition, the present disclosure is not described with reference to any particular programming language. It will be appreciated that a variety of programming languages may be used to implement the teachings of the present disclosure as described herein, and any references below to specific languages are provided for disclosure of enablement and best mode of the present disclosure.

As shown in FIG. 1, a method for tracking a position of an object 100 in a scene 120 (also referred to herein as an "area 120" or a "3D scene 120") surrounding a vehicle 140 (also referred to herein as an "ego-vehicle 140," an "own vehicle 140," a "mobile machine 140," and/or a combination thereof) (hereafter, "the method") is disclosed. It is contemplated that the method may be described and/or implemented as a system. Additionally, it is contemplated that a position of the object 100 may also be understood as a 3D position of the object 100 in the 3D scene 120. Referring to FIG. 1, the object 100 is another moving vehicle present in the scene 120 surrounding the vehicle 140. Additionally, it is contemplated that a plurality of objects 100 may be tracked in the scene 120 surrounding the vehicle 140 simultaneously; however, the plurality of objects 100 will be referred to herein as "the object 100." Additionally, a scene feature 125 may be present in the scene 120 surrounding the vehicle 140. The scene feature 125 may include a road sign, lane marker, tree, non-moving vehicle, house and/or building facade, and the like. It is contemplated that a plurality of scene features 125 may be present in the scene 120 surrounding the vehicle 140; however, the plurality of scene features 125 will be referred to herein as "the scene feature 125," unless reference to the plurality of scene features 125 is necessary. Additionally, the scene 120 surrounding the vehicle 140 may be understood to mean a scene 120 in front of the vehicle 140, a scene 120 to a side of the vehicle 140, and/or a scene to a rear of the vehicle 140.

In the disclosed embodiment, the method may be incorporated into one or more system already supported by the vehicle 140. Additionally, the vehicle 140 may be configured for automated driving and/or include an autonomous driving system. Accordingly, the method is contemplated to assist a driver of the vehicle 140 and/or improve performance of an autonomous driving system of the vehicle 140. To this end, the method is configured to automatically detect, track, and predict positioning of the object 100 in the scene 120 surrounding the vehicle 140, while accounting for an ego-motion of the vehicle 140, to reduce jitter observed in an image plane in which the object 100 is detected, tracked, and predicted, beyond a range of ground truth information acquired to train aspects of the method. It is contemplated that the term "egomotion" as used herein may be understood to be 3D motion of a camera (the imaging device 20, discussed further below) within an environment. Additionally or alternatively, the term "egomotion" refers to estimating motion of a camera (the imaging device 20) relative to a rigid scene (the scene 120). For example, egomotion estimation may include estimating a moving position of a vehicle (the vehicle 140) relative to lines on the road or street signs (the scene feature 125) surrounding the vehicle (the scene 120) which are observed from the vehicle. As the imaging device 20 is fixed to the vehicle 140, there is a fixed relationship (i.e. transformation) between a frame of the imaging device 20 and a frame of the vehicle 140. As such, an egomotion determined from a viewpoint of the imaging device 20 also determines the egomotion of the vehicle 140. As such, it is contemplated that the egomotion of the vehicle 140 is substantially similar to or the same as the egomotion of the imaging device 20. Accounting for the egomotion of the vehicle 140 allows for stabilizing and improving the accuracy of detecting, tracking, and predicting the positioning of the object 100 beyond a range of ground truth information acquired to train aspects of the method.

Figure 2:
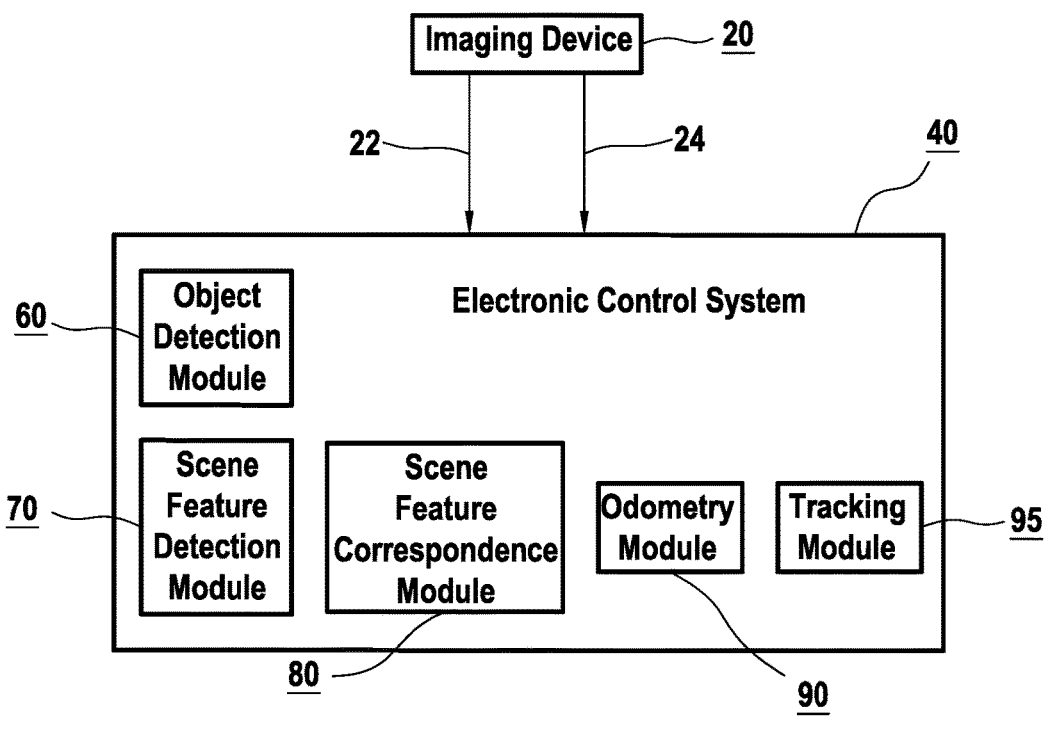
FIG. 2 is a schematic view of aspects of the method of FIG. 1.
Figure 3:
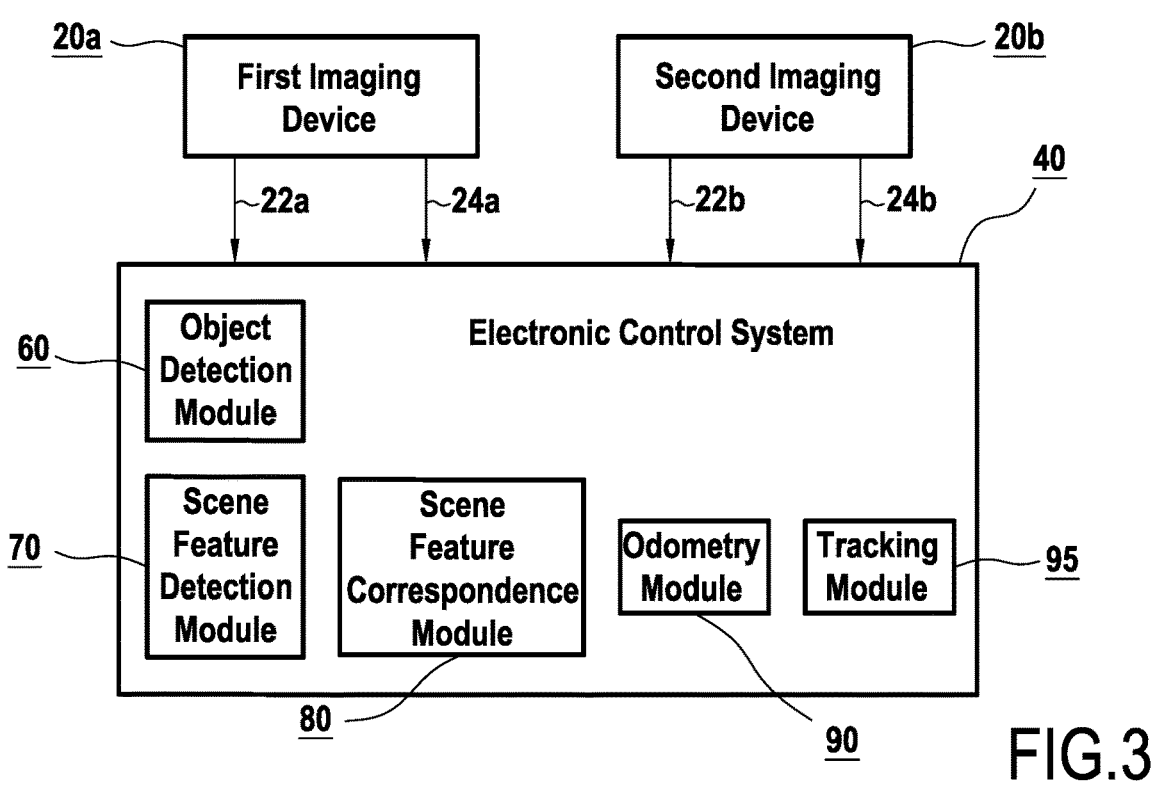
FIG. 3 is a schematic view of aspects of the method of FIG. 1.

The method is contemplated to operate in real-time based upon visual recognition and/or detection of the object 100 and scene feature 125 present in the scene 120 surrounding the vehicle 140 in successive images. As such, as shown in FIGS. 2-3, the method includes use of one or more imaging device 20 (also referred to herein as an "optical instrument 20"), one or more electronic control system (ECS) 40, an object detection module 60, a scene feature detection module 70, a scene feature correspondence module 80, an odometry module 90, and a tracking module 95. As discussed herein, the object detection module 60, the scene feature detection module 70, the scene feature correspondence module 80, the odometry module 90, and/or the tracking module 95 may communicate with each other as part of the ECS 40. As such, processing undertaken by the object detection module 60, the scene feature detection module 70, the feature correspondence module 80, the odometry module 90, and/or the tracking module 95 may be described herein as being processed by the ECS 40. Additionally or alternatively, the object detection module 60, the scene feature detection module 70, the scene feature correspondence module 80, the odometry module 90, and/or the tracking module 95 may be included in an electronic device (not shown) which is separate from the ECS 40 and capable of communication with the ECS 40. The ECS 40 may also be referred to and/or described herein as an "electronic control unit (ECU) 40." By applying information acquired and processed by the imaging device 20, the ECS 40, the object detection module 60, the scene feature detection module 70, the scene feature correspondence module 80, the odometry module 90, and/or the tracking module 95, the method is capable of detecting, tracking, and/or predicting the position of the object 100 with respect to the vehicle 140 with improved stabilization and accuracy of the object 100 in the image plane in which the object 100 is detected, tracked, and/or predicted, beyond a range of ground truth information acquired to train aspects of the method.

It is contemplated that the imaging device 20 used in the method is positioned on the vehicle 140, so as to provide an adequate field of view of the scene 120 surrounding the vehicle 140. The imaging device 20 may be mounted to an exterior of the vehicle 140 and/or to an interior of the vehicle 140. For example, the imaging device 20 may be positioned behind a windshield, on a front bumper, on a side view minor, on a rearview minor, behind a rear window, on a rear bumper, and/or any other suitable mounting location on the vehicle 140 so as to provide an adequate field of view of the object 100 in the scene 120 surrounding the vehicle 140. It is contemplated that the term "adequate" as used herein, when referring to a field of view, may be understood as a field of view providing the imaging device 20 with the ability to provide image data to the ECS 40 at a great enough distance so as to allow sufficient time for the ECS 40 to respond to presence of the object 100 in the field of view of the imaging device 20. For example, an adequate field of view to the right or left of a vehicle 140 may include a view of a lane immediately next to the vehicle 140 and/or two or more lanes away from the vehicle 140, and any other vehicles and/or lane markers in the lanes.

Figure 4:
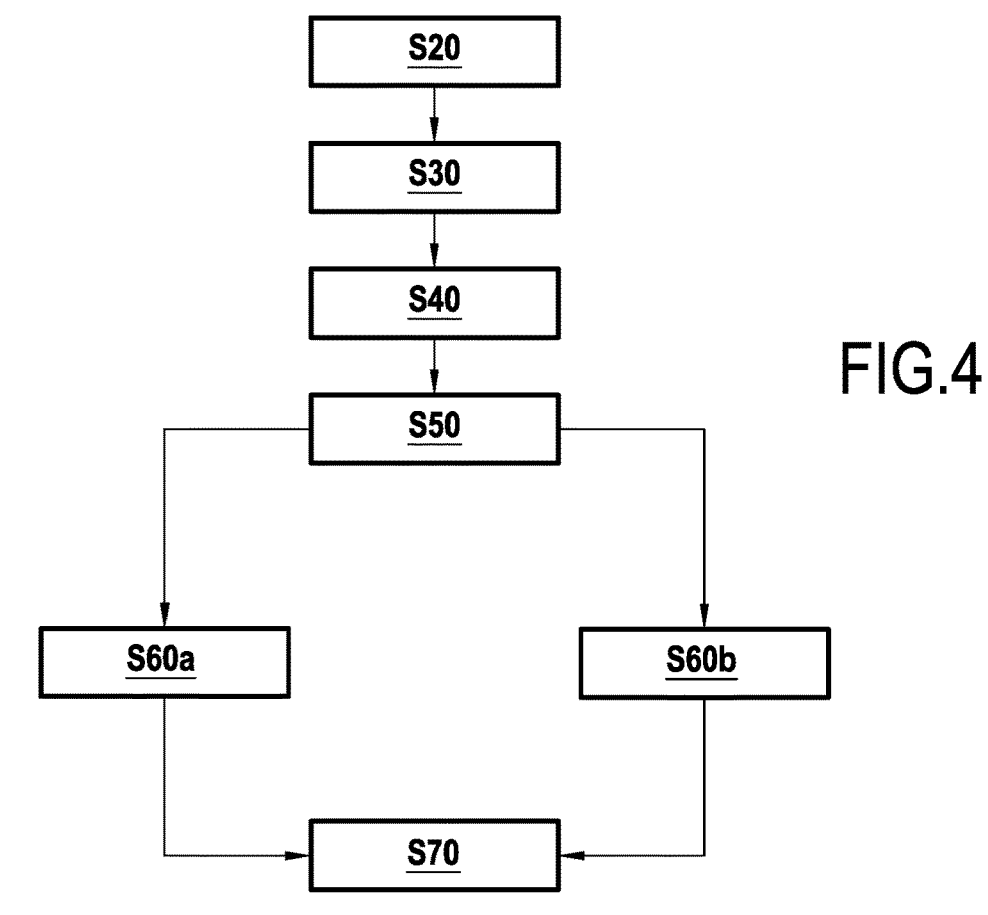
FIG. 4 is a schematic view of aspects of the method of FIG. 1.

As shown in FIGS. 2-4, the imaging device 20 is capable of capturing and/or acquiring an image (image data) 22, 24 of the scene 120 surrounding the vehicle 140 according to a step S20 of the method. Particularly, the imaging device 20 is capable of capturing an image 22, 24 of the object 100 and the scene feature 125 present within the scene 120 surrounding the vehicle 140. In the disclosed embodiment, the imaging device is a camera. Specifically, the imaging device 20 may be a monocular camera. As such, the imaging device 20 is capable of acquiring image data 22, 24 providing appearance information (color, e.g. RGB) corresponding to the scene 120. Additionally or alternatively, referring to FIG. 3, it is contemplated that the method may include use of a first imaging device 20a configured to capture a first image 22a and a second image 24a and a second imaging device 20b configured to capture a first image 22b and a second image 24b. However, the first imaging device 20a and the second imaging device 20b may be referred to herein as "the imaging device 20," unless it is otherwise necessary to reference the first imaging device 20a and the second imaging device 20b directly. Additionally, the first images 22a, 22b of the first imaging device 20a and the second imaging device 20b and second images 24a, 24b of the first imaging device 20a and the second imaging device 20b may also be referred to herein collectively as "the first image 22" and "the second image 24," unless it is otherwise necessary to refer to the first images 22a, 22b of the first imaging device 20a and the second imaging device 20b and second images 24a, 24b of the first imaging device 20a and the second imaging device 20b directly. Additionally or alternatively, the method may include use of a plurality of imaging devices 20 beyond the first imaging device 20a and the second imaging device 20b, such as a third and fourth imaging device 20, configured to capture images 22, 24 of the scene 120. However, the plurality of imaging devices 20 may be referred to herein as "the imaging device 20," unless it is otherwise necessary to reference the plurality of imaging devices 20 directly.

Referring to FIGS. 2-3, the imaging device 20 is configured to transmit the image 22, 24 to the ECS 40. Additionally, the imaging device 20 includes a unique imaging device identifier configured to provide identification of the imaging device 20 to the ECS 40. The imaging device 20 is configured to transmit the imaging device identifier to the ECS 40. It is contemplated that the imaging device 20 may transmit the image 22, 24, as well as the imaging device identifier, to the ECS 40 via a wired connection, a wireless connection, or any other manner of transmitting data which may be compatible with the method. The imaging device identifier may include information corresponding to a type of imaging device 20, a position of the imaging device 20, viewpoint parameters of the imaging device 20, and the like. The term "viewpoint parameters" as used herein may be understood to be specifications of the imaging device 20, such as, for example, rotation, resolution, distortion, projection model, field of view, and the like. As such, it is contemplated that the imaging device identifier may communicate intrinsic parameters corresponding to the imaging device 20.

In the disclosed embodiment, the imaging device 20 is configured to capture a first image 22 and a second image 24 consecutively. Additionally or alternatively, the imaging device 20 may be configured to capture a plurality of images beyond the first image 22 and the second image 24, for example, a third image and a fourth image; however, the plurality of images beyond the first image 22 and the second image 24 may also be referred to as the first image 22 and the second image 24. As shown in FIG. 1, the first image 22 and the second image 24 may correspond to a state of the object 100 and/or the scene feature 125 in the scene 120 surrounding the vehicle 140 at a given time t. For example, the first image 22 may correspond to the time t-1 and the second image 24 may correspond to the time t. In this example, an anticipated and/or predicted state of the object 100 would correspond to a time t+1. In the disclosed embodiment, the first image 22 and the second image 24 each include first (input) viewpoint parameters.

As shown in FIG. 4, the method may include calibrating the imaging device 20. Calibration of the imaging device 20 may be based upon information corresponding to the imaging device 20 provided to the ECS 40 via the imaging device identifier. Additionally or alternatively, the ECS 40 may be configured to evaluate one or more of the first image 22 and the second image 24 to determine whether the imaging device 20 from which the image 22, 24 was received is properly calibrated. Evaluation of one or more of the first image 22 and the second image 24 may also be based upon information provided to the ECS 40 via the imaging device identifier.

Referring to FIG. 3, evaluating one or more of the first image 22 and the second image 24 may include the ECS 40 comparing aspects of the object 100 and/or the scene feature 125 present in one or more of a first image 22a and a second image 24a of a first imaging device 20a to aspects of the object 100 and/or the scene feature 125 in one or more of a first image 22b and a second image 24b of a second imaging device 20b to determine whether the aspects of the object 100 and/or the scene feature 125 captured by the first imaging device 20a correlate with the aspects of the object 100 and/or the scene feature 125 captured by the second imaging device 20b. A finding that the aspects of the object 100 and/or the scene feature 125 in one or more of the first image 22a and the second image 24a of the first imaging device 20a do not match and/or overlap with the aspects of the object 100 and/or the scene feature 125 in one or more of the first image 22b and the second image 24b of the second imaging device 20b may lead to a determination that one or more of the first imaging device 20a and the second imaging device 20b is not properly calibrated.

The ECS 40 is then configured to calibrate the imaging device 20 if it is determined that calibration of the imaging device 20 is required. The method for calibrating the imaging device 20 may be analogous to the method described in PCT/EP2019/068763, the contents of which are incorporated by reference. It is contemplated that the calibration configuration of a first imaging device 20a may be used to calibrate a second imaging device 20b. Additionally or alternatively, it is contemplated that the pre-calibration configuration of a first imaging device 20a may be used to calibrate the second imaging device 20b. Additionally or alternatively, calibrating a second imaging device 20b may include aligning an optical flow (discussed below) of the second imaging device 20b with an optical flow constructed for a first imaging device 20a. Additionally or alternatively, in an imaging device arrangement which includes the imaging device 20 positioned behind a windshield of the vehicle 140, calibrating the imaging device 20 may include obtaining a projection function of the imaging device 20 mounted behind the windshield. Additionally, the projection function may be determined as a function of at least one refraction parameter.

As shown in FIGS. 2-3, the ECS 40 is configured to receive the image 22, 24 from the imaging device 20. As such, the ECS 40 is configured to receive the first viewpoint parameters of the input image 22, 24 from the imaging device 20. Additionally, the ECS 40 is configured to receive the imaging device identifier from the imaging device 20. The ECS 40 is then configured to process the input image 22, 24 received from the imaging device 20. To this end, it is contemplated that the ECS 40 may include an image processing unit. The image 22, 24 processed by the ECS 40 may also be referred to herein as "the processed image 22, 24." As shown in FIG. 4 of the disclosed embodiment, processing the image 22, 24 may include the ECS 40 being configured to correct the image 22, 24 by converting the first viewpoint parameters into second viewpoint parameters according to a step S30 of the method. It is contemplated that the second viewpoint parameters may also be referred to herein as "virtual" and/or "output" viewpoint parameters. Correction of the image 22, 24 and/or conversion of the image 22, 24 from first viewpoint parameters to second viewpoint parameters facilitates detection of the object 100 and the scene feature 125. Particularly, correction of the image 22, 24 from first viewpoint parameters to second viewpoint parameters simplifies mathematics and exaction time corresponding to detection of the object 100 and the scene feature 125. The second viewpoint parameters may be determined based upon the imaging device identifier provided by the imaging device 20 to the ECS 40. Additionally, the second viewpoint parameters may correspond to conversion information associated with a stored virtualization record. The conversion information may include one or more of distortion compensation information, image rectification information, image refraction information, and/or rotational information. Additionally or alternatively, the conversion information may correspond to one or more of a standard lens-type, a pinhole lens-type, a fisheye lens-type, radial distortion, tangential distortion, cylindrical projection, and equirectangular projection. The conversion information and/or the virtualization record may be stored in a database. To this end, the ECS 40 may be linked to one or more database. Additionally or alternatively, the ECS 40 may be configured to store data that may be utilized for processing the image (for example, viewpoint parameter conversion tables, processing applications, imaging device identifiers, and the like). Following identification of the imaging device 20 and conversion information corresponding to the identified imaging device 20, the ECS 40 may convert the first viewpoint parameters to the second viewpoint parameters by applying the conversion information to the image 22, 24 provided by the imaging device 20. The method for converting the first viewpoint parameters to second viewpoint parameters may be analogous to the method described in PCT/EP2019/053885, the contents of which are incorporated by reference.

As shown in FIG. 4, the method includes detecting the object 100 captured in the first image 22 and the second image 24 according to a step S40 of the method. In the disclosed embodiment, the object 100 is detected by the ECS 40 and/or the object detection module 60 configured for use in the method; however, detection of the object 100 will be described herein as being detected by the object detection module 60. In the disclosed embodiment, the object detection module 60 includes a neural network. In particular, the object detection module 60 includes a convolutional neural network suitable for analyzing visual imagery. It is contemplated that the neural network of the object detection module 60 is trained to recognize and/or detect the object 100 captured in the image 22, 24 by the imaging device 20. To this end, the object detection module 60 is configured to detect the object 100 by appearance of the object 100. In particular, the object detection module 60 is configured to detect the object 100 by a size of the object 100, a shape of the object 100, a color of the object 100, a pose of the object 100, 3D-3D projection of the object 100, and the like. It is contemplated that the object 100 detected by the object detection module 60 is the object 100 that is tracked by way of the method disclosed herein. Further, it is contemplated that the object detection module 60 is configured to communicate information corresponding to the detected object 100 to the tracking module 95, so that a position of the object 100 may be tracked and/or predicted by the tracking module 95.

Detecting the object 100 in the first image 22 and the second image 24 may include determining a location of a 3D bounding box surrounding the object 100 in the first image 22 and the second image 24. Additionally, a displacement (a relative parameter) between one or more pixel and one or more reference point in the first image 22 and the second image 24 may be used as parameters of the object 100. It is contemplated that the reference point is a projection into a plane of the first image 22 and the second image 24 of a given position in 3D space on a 3D bounding box surrounding the object 100 in the first image 22 and the second image 24. Reference points may be projected at a plurality of corners of a 3D bounding box. Additionally or alternatively, the reference points may be projected at centroids of top and bottom faces of the 3D bounding box. In this manner, when the first image 22 and the second image 24 are input into the object detection module 60, the object detection module 60 delivers a displacement between a pixel of a group of pixels belonging to the object 100 and every reference point of the object 100. Detecting the object 100 by a displacement between one or more pixels and one or more reference points facilitates determination of 6D pose of the object 100. It is contemplated that the term "6D pose" as used herein may be understood to mean a position and/or orientation of the object 100 in space. Determination of 6D pose allows the ECS 40 and/or the object detection module 60 to better perceive the object 100. The method for determining the location of the 3D bounding box surrounding the object 100 and using displacements between pixels and reference points as parameters may be analogous to the method described in PCT/EP2019/053885, the contents of which are incorporated by reference.

Additionally, as shown in FIG. 4, the method includes detecting the scene feature 125 of the scene 120 captured in the first image 22 and the second image 24 according to the step S40 of the method. In the disclosed embodiment, the scene feature 125 is detected by the ECS 40 and/or the scene feature detection module 70 configured for use in the method; however, detection of the scene feature 125 will be described herein as being detected by the scene feature detection module 70. In the disclosed embodiment, the scene feature detection module 70 may utilize an algorithm, such as a Harris corner detector algorithm, configured to identify salient aspects of the scene feature 125 captured in the first image 22 and the second image 24. Further, it is contemplated that the scene feature detection module 70 is configured to communicate information corresponding to the detected scene feature 125 to the scene feature correspondence module 80, so that the scene feature 125 may be matched across the first image 22 and the second image 24.

As shown in FIGS. 1 and 4, once the scene feature 125 is detected in the first image 22 and the second image 24, the scene feature 125 is matched between the first image 22 and the second image 24 by the ECS 40 and/or the scene feature correspondence module 80 according to a step S50 of the method; however, matching the scene feature 125 between the first image 22 and the second image 24 will be described herein as being matched by the scene feature correspondence module 80. The scene feature 125 which is matched by the scene feature correspondence module 80 may be in the form of individual pixels in an image plane of the first image 22 and the second image 24. Additionally or alternatively, it is contemplated that the scene feature correspondence module 80 may be configured to match the scene feature 125 between images beyond the first image 22 and the second image 24; for example, the scene feature correspondence module 80 may be configured to match the scene feature 125 between the first image 22 and a fourth image and/or a stream of frames of a video. Additionally or alternatively, it is contemplated that the scene feature 125 may be matched between the first image 22 and the second image 24 to construct and/or be characterized as an optical flow between the first image 22 and the second image 24. It is contemplated that the term "optical flow" as used herein may be understood as an apparent motion of the scene feature 125 in the scene 120, caused by relative motion of an observer (the imaging device 20) in the scene 120. Additionally or alternatively, the term "optical flow" may be understood as an apparent motion of individual pixels in an image plane, calculated per pixel in the image 22, 24 (in 2D), caused by relative motion of the observer in the scene 120.

In the disclosed embodiment, the scene feature correspondence module 80 may apply a Lucas-Kanade flow algorithm which provides an estimate of movement of the scene feature 125 in successive images of the scene 120. The Lucas-Kanade approach provides sub-pixel measurements between the first image 22 and the second image 24. As such, a movement vector is associated with each pixel of the scene feature 125 in the scene 120, which is obtained by comparing two consecutive images 22, 24. The Lucas—Kanade approach assumes that displacement of the contents of an image between the first image 22 and the second image 24 is small and approximately constant within a neighborhood of a point p under consideration. Thus, an optical flow equation may be assumed to hold for all pixels within a window centered at point p. Namely, the local image flow (velocity) vector $(V_x, V_y)$ must satisfy:

$$I_x(q_1)V_x + I_y(q_1)V_y = -I_t(q_1)$$

$$I_x(q_2)V_x + I_y(q_2)V_y = -I_t(q_2)$$

$$\vdots$$

$$I_x(q_n)V_x + I_y(q_n)V_y = -I_t(q_n)$$

where $q_1, q_2, \ldots,$ and $q_n$ are the pixels inside the window, and $I_x(q_i)$, $I_y(q_i)$, and $I_t(q_i)$ are the partial derivatives of an image I with respect to position x, y, and time t, evaluated at the point $q_i$ and at the current time. However, a simple pixel in the first image 22 may not include enough useful structure for matching with another pixel in the second image 24. As such, the Lucas-Kanade approach may be applied with use a neighborhood of pixels; for example, a 2×2 matrix and/or a 3×3 matrix (the essential matrix). As such, the above equations can be written in matrix form, Av=b, where:

$$A = \begin{bmatrix} I_x(q_1) & I_y(q_1) \\ I_x(q_2) & I_y(q_2) \\ \vdots & \vdots \\ I_x(q_n) & I_y(q_n) \end{bmatrix} \quad v = \begin{bmatrix} V_x \\ V_y \end{bmatrix} \quad b = \begin{bmatrix} -I_t(q_1) \\ -I_t(q_2) \\ \vdots \\ -I_t(q_n) \end{bmatrix}$$

The system approach has more equations than unknowns, and thus is usually over-determined. The Lucas-Kanade approach obtains a compromise solution by the least squares principle, wherein a 2×2 system is solved:

$$A^T Av = A^T \text{ or}$$

$$v = (A^T A)^{-1} A^T b$$

where $A^T$ is the transpose of matrix A. As such, it computes:

$$\begin{bmatrix} V_x \\ V_y \end{bmatrix} = \begin{bmatrix} \sum_i I_x(q_i)^2 & \sum_i I_x(q_i)I_y(q_i) \\ \sum_i I_y(q_i)I_x(q_i) & \sum_i I_y(q_i)^2 \end{bmatrix}^{-1} \begin{bmatrix} -\sum_i I_x(q_i)I_t(q_i) \\ -\sum_i I_y(q_i)I_t(q_i) \end{bmatrix}$$

where the central matrix in the equation is an inverse matrix, and the sums are running from i=1 to n. The matrix $A^T A$ may be referred to as the structure tensor of the image at point p.

The scene feature correspondence module 80 may also be configured to evaluate flow field vectors of the first image 22 and the second image 24 for potential tracking errors and/or to exclude outliers from the optical flow calculation. It is contemplated that the term "outlier" as used herein may be understood to mean aspects which are not of interest in the image 22, 24, such as aspects of other moving vehicles (e.g. the object 100) which may be present in the scene 120 surrounding the vehicle 140. The egomotion of the vehicle 140 is determined by apparent 3D motion of the imaging device 20 and/or the vehicle 140 in the rigid scene 120 surrounding the vehicle 140, not by aspects of other moving vehicles (e.g. the object 100) which may be present in the scene 120 surrounding the vehicle 140. As such, the scene feature correspondence module 80 may be configured to exclude outliers in the scene 120 by usage of a random sample consensus (RANSAC) approach. The algorithm used in the RANSAC approach is capable of estimating parameters of a mathematical model from the first image 22 and the second image 24, which may contain one or more outliers. When an outlier is detected, the outlier may be excluded from the optical flow calculation and/or accorded no influence on values of the estimates. As such, the RANSAC approach may be interpreted as an outlier detection and removal mechanism.

The RANSAC approach includes two steps which are iteratively repeated. In the first step, a sample subset containing minimal data items is randomly selected from the image data 22, 24. A fitting model and corresponding model parameters are computed using only the elements of the sample subset. The cardinality of the sample subset is the smallest sufficient to determine the model parameters. In the second step, the algorithm evaluates which elements of the image data 22, 24 are consistent with the model instantiated by the estimated model parameters obtained from the first step. A data element is determined to be an outlier if the data element does not fit the fitting model instantiated by the set of estimated model parameters within an error threshold which defines the maximum deviation attributable to the effect of noise. Consequently, the outlier may be excluded from the optical flow calculation and/or accorded no influence on values of the estimates. In this manner, given an initial set of the scene feature 125 in consecutive images 22, 24, feature correspondences of the set of the scene feature 125 may be verified. Additionally, given an initial set of the scene feature 125 correspondences, an estimate may be determined for the essential matrix, which may include information corresponding to the egomotion of the vehicle 140 and/or a relative rotation of the vehicle 140 in the scene 120 surrounding the vehicle 140. By using the RANSAC approach to exclude outliers, an estimate of the egomotion of the vehicle 140 and/or the relative rotation of the vehicle 140 in the scene 120 may be obtained. Additionally or alternatively, an object mask may be applied to exclude an outlier from the optical flow calculation. In the disclosed embodiment, the object mask may be applied in a scene surrounding the vehicle 140 which includes heavy traffic and/or numerous other vehicles e.g. the object 100), wherein use of the RANSAC approach may be difficult. Further, it is contemplated that the scene feature correspondence module 80 is configured to communicate information corresponding to the scene feature 125 matched across the first image 22 and the second image 24 to the odometry module 90, so that the scene feature 125 matched across the first image 22 and the second image 24 may be used to determine the egomotion of the vehicle 140.

As shown in FIG. 4 of the disclosed embodiment, the egomotion of the vehicle 140 may be obtained according to a step S60*a* of the method. In the disclosed embodiment, to determine the egomotion of the vehicle 140 between consecutive images 22*a*, 22*b*, 24*a*, 24*b* acquired by a plurality of imaging devices 20*a*, 20*b* (which are monocular cameras), a generalized camera model approach may be used. As such, the plurality of imaging devices 20*a*, 20*b* are treated as a generalized imaging device 20*a*, 20*b*. It is contemplated that the term "generalized," as used herein with respect to the plurality of imaging devices 20*a*, 20*b*, may be understood as image observations being represented by 3D rays, which are not necessarily emanating from the same imaging device 20*a*, 20*b* center and/or a common center. In the disclosed embodiment, the generalized egomotion of the vehicle 140 is extracted from at least six feature correspondences of the scene feature 125 and/or the scene 120 from any of the viewpoints of the generalized imaging device 20*a*, 20*b*. Specifically, a rotation of the vehicle 140 and a translation of the vehicle 140 are obtained. Additionally or alternatively, it is contemplated that excluding outliers in the scene 120, by usage of the RANSAC approach, may be a part of and or incorporated into step S60*a* of the method.

In the disclosed embodiment, the egomotion of the vehicle 140 is obtained by the ECS 40 and/or the odometry module 90; however, obtaining the egomotion of the vehicle 140 will be described herein as being obtained by the odometry module 90. Accordingly, the odometry module 90 applies an algorithm to obtain a rotation of the vehicle 140 and a translation of the vehicle 140. For example, the odometry module 90 may apply a Ventura approach (Ventura, J., Arth, C., & Lepetit, V. (2015). "An Efficient Minimal Solution for Multi-Camera Motion". 2015 *IEEE International Conference on Computer Vision (ICCV)*. 747-755. 10.1109/ICCV.2015.92. To this end, in the algorithm applied by the odometry module 90, a column vector is represented by a lowercase letter a, a matrix is represented by an uppercase letter A, and a scalar is represented by an italicized lowercase letter a. Additionally, $[a]_x$ represents a skew-symmetric matrix such that $[a]_x b = a \times b$ for all b and dimensions of a matrix are represented by a sub-script, e.g. $A_{3 \times 3}$ for a 3×3 matrix. For the generalized imaging device, the 3D rays are parameterized as six-dimensional vectors in Plücker coordinates (six homogeneous coordinates assigned to each line in projective 3-space). Additionally, the epipolar constraint is replaced with the generalized epipolar constraint:

$$v_i^T \begin{pmatrix} -[t]_x R & R \\ R & 0_{3 \times 3} \end{pmatrix} u_i = 0$$

where, $u_i$ and $v_i$ are corresponding rays in the first image 22*a*, 22*b* and the second image 24*a*, 24*b*, respectively, R is the rotation of the vehicle 140 between the first image 22*a*, 22*b* and the second image 24*a*, 24*b*, and t is the translation between the first image 22*a*, 22*b* and the second image 24*a*, 24*b*.

In this case, a first order approximation is applied to the rotation matrix R, parameterized by a three-vector r=[x y z]$^T$:

$$R \approx I_{3 \times 3} + [r]_x$$

where, the approximated generalized epipolar constraint may now be rearranged to isolate the rotation and translation parameters. After stacking all six feature correspondences of the scene feature 125 and/or the scene 120, the outcome is an equation system:

$$M(r) \begin{bmatrix} t \\ 1 \end{bmatrix} = 0$$

where, M(r) is a 6×4 matrix of linear expressions in x, y, z. Since M(r) includes a null vector, it must be of rank at most three. As such, all 4×4 sub-determinants of M(r) must equal zero. This allows $$\binom{6}{4} = 15$$

equations which only involve the rotation parameters. The fifteen equations may be written in matrix form by separating the coefficients into a 15×35 matrix A and the terms into a vector of monomials m:

$$Am = 0$$

thereafter, a solution is derived for the system of equations described in the above equation.

In the disclosed embodiment, the solution for the system of equations described in the above equation is a solution by reduction to a single polynomial. Here, if variable z is hidden, the expression Am=0 may be rewritten as:

$$C(z)m' = 0$$

where, C(z) is a 15×15 matrix of polynomials in z and m' includes monomials in x and y. Thereafter, the following may be used to arrive at a single twentieth degree polynomial in z:

$$\det(C(z)) = 0$$

In this manner, the rotation of the vehicle 140 and the translation of the vehicle 140 between the first image 22*a*, 22*b* and the second image 24*a*, 24*b* are extracted from at least six feature correspondences of the scene feature 125 and/or the scene 120 by solving a twentieth degree polynomial.

Additionally or alternatively, the odometry module 90 may be configured to apply a linear approach. To this end, the odometry module 90 may estimate the essential matrix relating to corresponding aspects of the scene feature 125 in the first image 22 and the second image 24. As shown in FIG. 4 of the disclosed embodiment, the egomotion of the vehicle 140 may be determined and/or derived from the essential matrix according to a step S60*b* of the method. For example, the egomotion of the vehicle 140 may be derived from an essential matrix which may be expressed as:

$$E = R[t]_x$$

where, R is a 3×3 rotation matrix, t is a 3-dimentsional translation vector, and $[t]_x$ is the matrix representation of the cross product with the translation vector t. Consequently, the essential matrix implicitly includes information relating to a rotation of the imaging device 20 and a translation of the imaging device 20. Accordingly, the rotation and translation of the imaging device 20 may be determined and/or derived from the essential matrix. It is contemplated that the rotation and translation of the vehicle 140 may be determined and/or derived from the essential matrix by performing the singular value decomposition (SVD) of the essential matrix. Additionally or alternatively, it is contemplated that excluding outliers in the scene 120 by usage of the RANSAC approach may be a part of and or incorporated into step S60*b* of the method. Further, it is contemplated that the odometry module 90 is configured to communicate information corresponding to the egomotion of the vehicle 140 to the tracking module 95, so that the egomotion of the vehicle 140 may be used to improve stabilization and accuracy of tracking and/or prediction of a position of the object 100 in the image plane in which the position of object 100 is tracked and/or predicted.

As shown in FIGS. 1 and 4, the method includes tracking, estimating, and/or predicting a position of the object 100 in the scene 120 surrounding the vehicle 140 according to a step S70 of the method. In the disclosed embodiment, the position of the object 100 is tracked, estimated, and predicted in the scene 120 surrounding the vehicle 140 by the ECS 40 and/or the tracking module 95; however, tracking, estimating, and/or predicting the position of the object 100 will be described herein as being tracked, estimated, and predicted by the tracking module 95. Tracking of the object 100 in the scene 120 surrounding the vehicle 140 may be based upon an Extended Kalman Filter approach, as is described in PCT/EP2019/053885. Additionally, in order to track, estimate, and/or predict the position of the object 100 in the scene 120 surrounding the vehicle 140, the egomotion of the vehicle 140 is taken into account, according to a modified Extended Kalman Filter approach. As such, in the tracking algorithm applied by the tracking module 95, a state of the tracked object 100 is represented in a local coordinate system, using the egomotion and/or estimated pose of the vehicle 140 as a reference. Consequently, predictions of the position of the object 100 are adapted to movement of the vehicle 140. As shown in FIG. 1, the tracked object 100 is described, at the time t, with a set of multidimensional normal variables $\hat{x}_j \sim N(x_j, X_j)$ with j=1, . . . , n. The state of the tracked object 100 may be predicted from the previous state at the time t−1. Additionally, the state of the tracked object 100 may be predicted to an anticipated state at the time t+1. The prediction phase of the algorithm applied by the tracking module 95 is:

$$x_j \leftarrow f(x_j, R, T) X_j \leftarrow F X_j F^T + Q$$

$$x_j \leftarrow f(x_j, R, T)$$

where R is the relative transformation of the vehicle 140 from t−1 to t and T is the translation of the vehicle 140 from t−1 to t. Additionally, f is a state transition model, F is a Jacobian matrix of f, $X_j$ is a covariance matrix associated with $x_j$, and Q is a covariance matrix of expected noise. The state vector $x_j$ may be composed of a 3D position of the object 100; the width, height, and length of the 3D bounding box corresponding to the object 100; a yaw angle of the object 100; and/or a speed of the object 100. In this manner, by application of the modified Extended Kalman Filter, which incorporates the egomotion of the vehicle 140 as a reference, the method is capable of predicting the position of the object 100 in the scene 120 surrounding the vehicle 140 at the time t+1, with improved stabilization and accuracy of the object 100 in the image plane in which the position of the object 100 is detected, tracked, and/or predicted, beyond a range of ground truth information acquired to train aspects of the method. It is contemplated that tracking of the object 100 in the scene 120 surrounding the vehicle 140 may be projected as a viewpoint that is geometrically normalized by orthographic rectification (also referred to as "bird's-eye view").

It is contemplated that the method as described herein may be incorporated as part of a method for calculating information corresponding to a relative speed between an object and a camera. Incorporating the method as described herein as part of the method for calculating information relative to a relative speed between an object and a camera may optimize the method for calculating information corresponding to a relative speed between an object and a camera. The method for calculating information relative to a relative speed between an object and a camera may include the use of one or more imaging device 20 configured to capturing a first image 22 and a second image 24 of an object 100 and a scene feature 125 present in a scene 120. Once the imaging device 20 captures the first image 22 and the second image, the ECS 40 and/or the scene feature correspondence module 80 is configured to match features of the scene feature 125 between the first image 22 and the second image 24. The ECS 40 and/or the odometry module 90 is then configured to estimate motion during a transformation which transforms the first image 22 into the second image 24 and to determine one or more parameter of the transformation using the aspects of the scene feature 125 matched between the first image 22 and the second image 24. Based upon the one or more parameter of the transformation, the ECS 40 may calculate information relative to a relative speed between the object 100 and the imaging device 20. The method for calculating information corresponding to a relative speed between an object and a camera may be analogous to the method described in PCT/EP2020/071861, the contents of which are incorporated by reference.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims. Additionally, all of the disclosed features of the method may be transposed, alone or in combination, to a system and/or an apparatus and vice versa.

According to a first aspect of the present disclosure, a method for tracking a position of an object in a scene surrounding a mobile machine based upon information acquired from monocular images is provided. The method includes acquiring at least a first image at a first time and a second image at a second time, the first image and the second image each including image data corresponding to the object and a scene feature present in the scene surrounding the mobile machine; detecting the object in the first image and the second image; matching the scene feature across the first image and the second image; perform an estimation of an egomotion of the mobile machine based upon the scene feature matched across the first image and the second image; and predicting a position of the object taking into account the estimation of the egomotion of the mobile machine.

In the above aspect, estimating the egomotion of the mobile machine based upon the scene feature matched across the first image and the second image may include applying one or more of a generalized camera model and linear approach to obtain a rotation of the mobile machine from the first time to the second time and a translation of the mobile machine from the first time to the second time.

In the above aspect, predicting the position of the object taking into account the estimation of the egomotion of the mobile machine may include applying a modified Extended Kalman Filter algorithm which incorporates values for the rotation of the mobile machine from the first time to the second time and the translation of the mobile machine from the first time to the second time.

In the above aspect, estimating the egomotion of the mobile machine based upon the scene feature matched across the first image and the second image may include applying a RANSAC algorithm to exclude outliers from the first image and the second image.

In the above aspect, the method may include transmitting the first image and the second image to an electronic control system to correct the first image and the second image by converting first viewpoint parameters of the first image and the second image into second viewpoint parameters.

In the above aspect, correcting the first image and the second image may include conversion being based upon conversion information associated with a virtualization record stored by the electronic control system.

In the above aspect, correcting the first image and the second image may include the conversion information including one or more of distortion compensation information, image rectification information, image refraction information, and rotational information.

In the above aspect, the method further may include detecting the scene feature in the first image and the second image, and detecting the scene feature in the first image and the second image may include applying a Harris corner detector algorithm to identify aspects of the scene feature.

In the above aspect, matching the scene feature between the first image and the second image may include applying a local Lucas-Kanade algorithm to provide sub-pixel measurements between the first image and the second image.

In the above aspect, the method may include estimating 3D parameters of the object in the first image and the second image.

In the above aspect, the 3D parameters of the object in the first image and the second image may include the 3D parameters corresponding to a displacement between a pixel of a group of pixels belonging to the object and one or more reference point belonging to the object, the one or more reference point being at least one of a plurality of corners of a 3D bounding box or centroids of top and bottom faces of the 3D bounding box.

According to a second aspect of the present disclosure, a system for tracking a position of an object in a scene surrounding a mobile machine is provided. The system includes one or more imaging device configured to acquire at least a first image at a first time and a second image at a second time, and an electronic control system configured to process the first image and the second image. The first image and the second image each include image data corresponding to the object and a scene feature present in the scene surrounding the mobile machine. The electronic control system includes one or more processors configured to detect the object in the first image and the second image, match the scene feature across the first image and the second image, perform an estimation of an egomotion of the mobile machine, and predict a position of the object taking into account the estimation of the egomotion of the mobile machine.

In the above aspect, the system may include a plurality of the imaging device configured to acquire a plurality of consecutive images. The one or more processors may be configured to apply one or more of a generalized camera model approach and a linear approach to obtain a rotation of the mobile machine from the first time to the second time and a translation of the mobile machine from the first time to the second time.

In the above aspect, the one or more processors may be configured to apply a modified Extended Kalman Filter algorithm which incorporates values for the rotation of the mobile machine from the first time to the second time and the translation of the mobile machine from the first time to the second time.

In the above aspect, the imaging device may be a monocular camera.

What is claimed is:

1. A method for tracking a position of an object in a scene surrounding a mobile machine based upon information acquired from monocular images, the method comprising:

acquiring at least a first image at a first time and a second image at a second time, the first image and the second image each including image data corresponding to the object and a scene feature present in the scene surrounding the mobile machine;

detecting the object in the first image and the second image using a convolutional neural network trained to recognize the object by appearance;

detecting a scene feature in the first image and the second image by applying a Harris corner detector algorithm to identify aspects of the scene feature;

matching the scene feature across the first image and the second image using a local Lucas-Kanade optical flow algorithm to provide sub-pixel measurements between the first image and the second image;

excluding outliers from the matches scene features using a RANSAC algorithm;

performing an estimation of an egomotion of the mobile machine based upon the scene feature matched across the first image and the second image, wherein estimating the egomotion of the mobile machine based upon the scene feature matched across the first image and the second image includes applying one or more of a generalized camera model and linear approach to obtain a rotation of the mobile machine from the first time to the second time and a translation of the mobile machine from the first time to the second time; and predicting a position of the object taking into account the estimation of the egomotion of the mobile machine, wherein the prediction is performed by a modified Extended Kalman Filter algorithm which incorporates values for the rotation and translation of the mobile machine from the first time to the second time;

wherein the method further comprises correcting the first image and the second image by converting first viewpoint parameters of a first imaging device of the first image and the second image into second viewpoint parameters of a second imaging device based on conversion information associated with a virtualization record stored by an electronic control system, the conversion information including at least one of distortion compensation information, image rectification information, image refraction information, and rotational information.

2. The method according to claim 1, further comprising transmitting the first image and the second image to an electronic control system to correct the first image and the second image by converting first viewpoint parameters of the first imaging device of the first image and the second image into second viewpoint parameters of the second imaging device.

3. The method according to claim 1, further comprising estimating three-dimensional (3D) parameters of the object in the first image and the second image.

4. The method according to claim 3, wherein the 3D parameters of the object in the first image and the second image includes the 3D parameters corresponding to a displacement between a pixel of a group of pixels belonging to the object and one or more reference point belonging to the object, the one or more reference point being at least one of a plurality of corners of a 3D bounding box or centroids of top and bottom faces of the 3D bounding box.

5. A system for tracking a position of an object in a scene surrounding a mobile machine, the system comprising:

one or more imaging devices configured to acquire at least a first image at a first time and a second image at a second time the first image and the second image each including image data corresponding to the object and a scene feature present in the scene surrounding the mobile machine; and an electronic control system configured to process the first image and the second image, the electronic control system including one or more processors configured to detect the object in the first image and the second image using a convolutional neural network trained to recognize the object by appearance, detect a scene feature in the first image and the second image by applying a Harris corner detector algorithm to identify aspects of the scene feature, match the scene feature across the first image and the second image using a local Lucas-Kanade optical flow algorithm to provide sub-pixel measurements between the first image and the second image, excluding outliers from the matches scene features using a RANSAC algorithm, perform an estimation of an egomotion of the mobile machine based upon the scene feature matched across the first image and the second image, wherein estimation of the egomotion of the mobile machine based upon the scene feature matched across the first image and the second image includes applying one or more of a generalized camera model and linear approach to obtain a rotation of the mobile machine from the first time to the second time and a translation of the mobile machine from the first time to the second time, predict a position of the object taking into account the estimation of the egomotion of the mobile machine, wherein the prediction is performed by a modified Extended Kalman Filter algorithm which incorporates values for the rotation and translation of the mobile machine from the first time to the second time; and correct the first image and the second image by converting first viewpoint parameters of a first imaging device of the first image and the second image into second viewpoint parameters of a second imaging device based on conversion information associated with a virtualization record stored by an electronic control system, the conversion information including at least one of distortion compensation information, image rectification information, image refraction information, and rotational information.

6. The system according claim 5, wherein the imaging device is a monocular camera.

* * * * *